US005272914A

United States Patent [19]

Murata et al.

[11] Patent Number: 5,272,914

[45] Date of Patent: Dec. 28, 1993

[54] IGNITION SYSTEM FOR INTERNAL COMBUSTION ENGINES

[75] Inventors: Shigemi Murata; Masayuki Ikeuchi; Toshio Iwata; Toshio Ohsawa, all of Himeji, Japan

[73] Assignee: Mitsubishi Denki K.K., Tokyo, Japan

[21] Appl. No.: 770,264

[22] Filed: Oct. 3, 1991

[30] Foreign Application Priority Data

| | | | |
|---|---|---|---|
| Oct. 4, 1990 | [JP] | Japan | 2-265119 |
| Oct. 12, 1990 | [JP] | Japan | 2-272108 |
| Nov. 26, 1990 | [JP] | Japan | 2-324247 |

[51] Int. Cl.$^5$ .................... G01M 15/00

[52] U.S. Cl. .................... 73/116

[58] Field of Search .............. 73/116, 35; 364/431.08; 123/419

[56] References Cited

U.S. PATENT DOCUMENTS

| | | | |
|---|---|---|---|
| 4,359,893 | 11/1982 | Kizler et al. | 73/35 |
| 4,601,193 | 7/1986 | Blauhut et al. | 73/35 |
| 4,648,367 | 3/1987 | Gillbrand et al. | 73/35 |
| 4,672,928 | 6/1987 | Hartig | 123/169 E |
| 4,762,106 | 8/1988 | Blauhut . | |
| 4,987,771 | 1/1991 | Iwata . | |

FOREIGN PATENT DOCUMENTS

| | | |
|---|---|---|
| 3006665 | 9/1981 | Fed. Rep. of Germany . |
| 3339569 | 5/1985 | Fed. Rep. of Germany . |
| 3342723 | 7/1986 | Fed. Rep. of Germany . |
| 2-104978 | 4/1990 | Japan . |

*Primary Examiner*—Robert Raevis
*Attorney, Agent, or Firm*—Sughrue, Mion, Zinn, Macpeak & Seas

[57] ABSTRACT

An ignition system for internal combustion engines has an ignition coil having a primary winding and a secondary winding. The secondary winding supplies a high voltage for ignition to an ignition plug when the ignition coil is energized at the primary winding at a predetermined period. A voltage producing circuit produces a voltage on the basis of a signal developed across the primary winding when the primary winding is energized at a predetermined period. The voltage causes discharge across the electrodes of the ignition plug to form a path for an ion current developed in the cylinder. A comparator or detector detects the ion current to determine the combustion in a cylinder.

9 Claims, 13 Drawing Sheets

IGNITION SYSTEM FOR INTERNAL COMBUSTION ENGINES

BACKGROUND OF THE INVENTION

1. Field of the Invention

The present invention relates to an ignition system for internal combustion engines and more particularly to improvements of an ion current detector used for detecting misfiring of internal combustion engines.

2. Prior Art

FIG. 14 shows a conventional ignition system for internal combustion engines.

During operation, an ignition timing control unit 701 receives signals outputted at regular timings from a signal generator 716 and drives a power transistor 702 to turn on and off. That is, the transistor 702 operates as a switch for driving an ignition coil 700. When the coil 700 is driven, a back voltage is developed across the primary winding while a negative high voltage is developed across the secondary winding, so that the air-fuel mixture is ignited by an ignition plug 703. When the air-fuel mixture burns, an ion current i is developed to flow through the ignition plug 703, a diode 706, a resistor 707 and a battery 708 as well as through a capacitor 709 and a resistor 710. Then, a voltage appears across the resistor 710. The voltage across the resistor 710 is then supplied as an ion current signal to a comparator 711 which in turn compares the ion current signal with a reference voltage to detect the occurrence of ion current.

FIG. 15 shows another conventional ignition system. A power transistor 802 is turned on at a given timing in synchronism with the crank angle of an internal combustion engine and is turned off at an ignition timing. When the power transistor 802 is turned off to stop the primary current through the primary winding 1*a* of ignition coil, a negative high voltage is developed across the secondary winding 1*b* to cause a spark between the electrodes of an ignition plug 803, by which the air-fuel mixture is ignited. At this time, ions are produced due to the combustion of air-fuel mixture and a positively biasing power supply 808 causes discharge through the electrodes of the ignition plug 803 to form a closed path for an ion current. In this manner, the electrodes serve as an ion-detecting electrode through which an ion current flows. The ion current causes a voltage drop across a resistor 805 which appears at an output terminal 806. The detection of the voltage at the output terminal 806 indicates the combustion of air-fuel mixture.

The conventional ignition system in FIGS. 14-15 require power supplies 708 and 808 of about −200 VDC, which are usually large, heavy, and expensive. These power supplies are disadvantageous in mounting on vehicles.

SUMMARY OF THE INVENTION

An object of the present invention is to provide a small, inexpensive ion current detector used for an ignition system in an internal combustion engine.

An ignition system for an internal combustion engine has an ignition coil having a first winding and a second winding. The second winding supplies a high voltage for ignition to an ignition plug when the ignition coil is energized at the first winding at a predetermined period. A voltage producing circuit produces a voltage on the basis of a signal developed across the first winding when the first winding is energized at a predetermined period. The voltage causes discharge across the electrodes of the ignition plug to form a path for an ion current developed in the cylinder. A comparator or detector detects the ion current to determine the combustion in a cylinder.

BRIEF DESCRIPTION OF THE DRAWINGS

Features and other objects of the invention will be more apparent from the description of the preferred embodiments with reference to the accompanying drawings in which.

DETAILED DESCRIPTION OF THE PREFERRED EMBODIMENTS

First Embodiment

Figure 1:
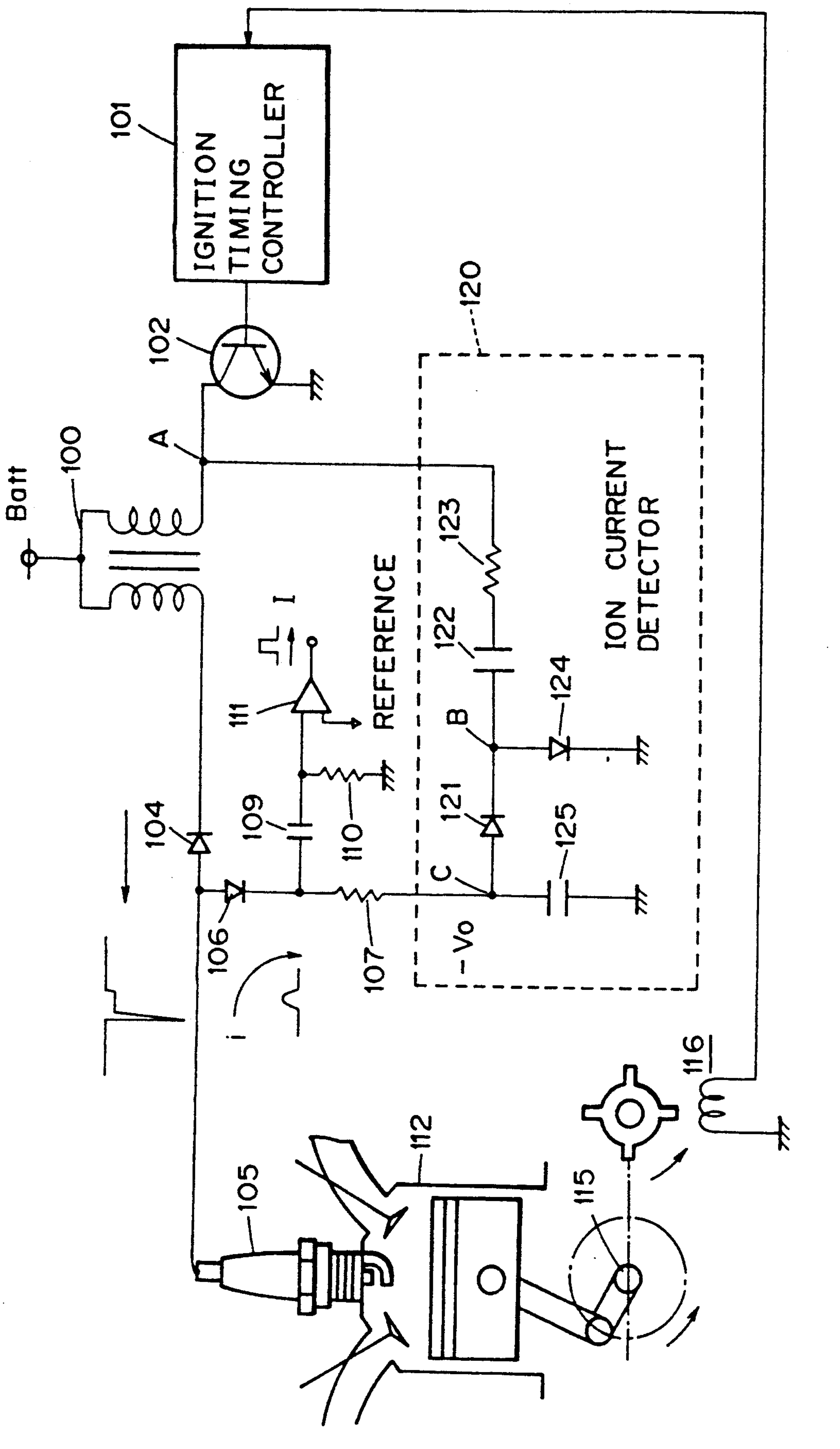
FIG. 1 shows a first embodiment of an ignition system according to the present invention.

FIG. 1 shows a first embodiment. An ion current detector 120 is provided between a resistor 107 and an ignition coil 100. In the figure, a drive signal from an ignition timing controller 101 drives a transistor 102 to turn on and off. The signal (FIG. 2A) appearing at a point A, the collector of the transistor 102, is supplied to a series circuit of a resistor 123 and a capacitor 122, which serves as a differentiating circuit to a signal inputted thereto so as to output a differentiated waveform shown in FIG. 2B. The differentiated waveform is then rectified by diodes 121 and 124 so that the rectified negative voltage −Vo is held across a capacitor 125. This negative voltage −Vo is used as a d-c power supply for detecting an ion current. That is, the ion current i flows through a diode 106 and then a resistor 107 into the capacitor 125 so that the ion current i is superposed to the negative voltage −Vo. Then, a voltage due to ion current appears across a resistor 110 via a capacitor 109. A comparator 111 compares the voltage across the resistor 110 with a reference voltage to output an ion current signal I.

Second Embodiment

Figure 3:
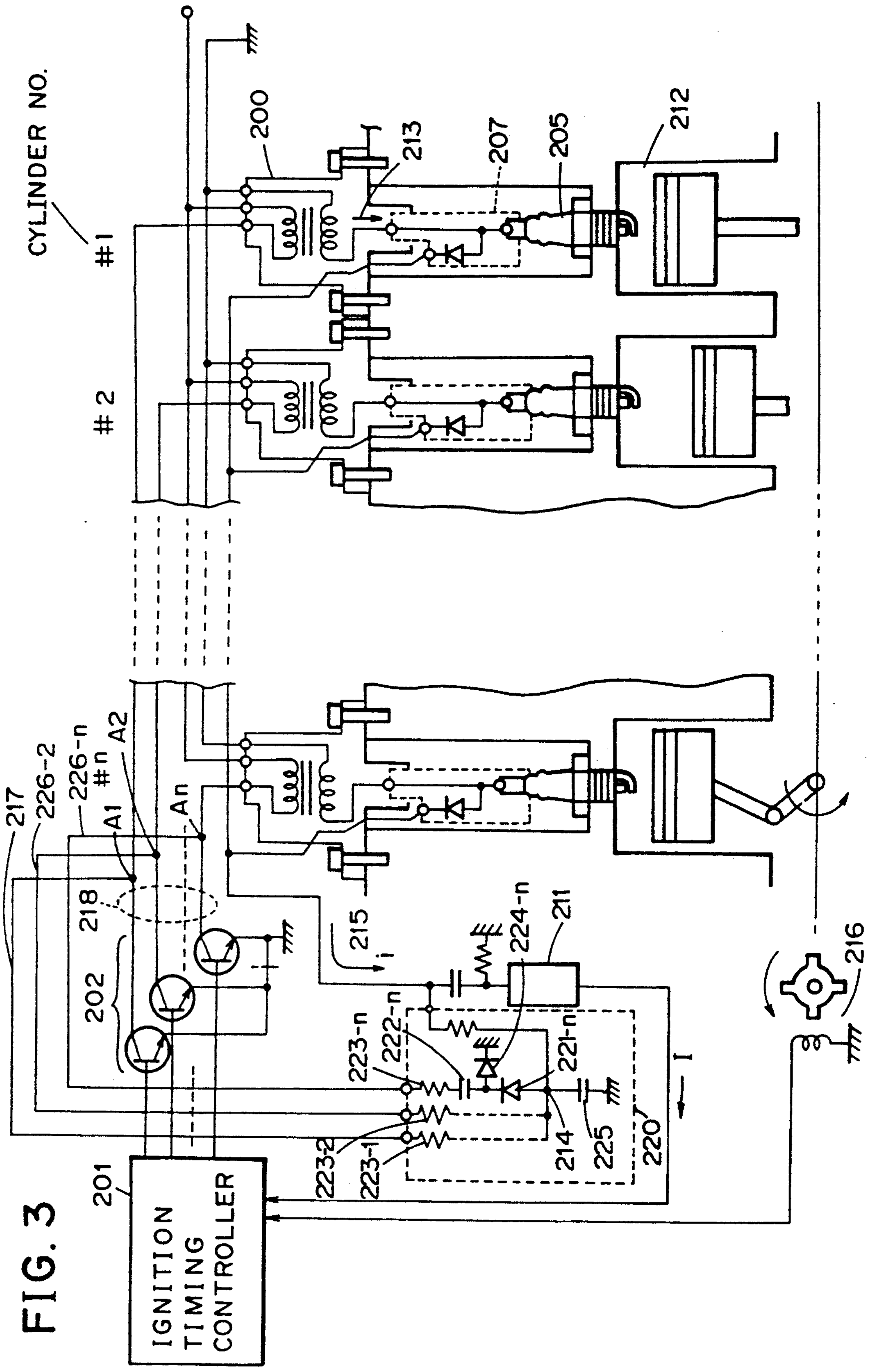
FIG. 3 shows a second embodiment.
Figure 6:
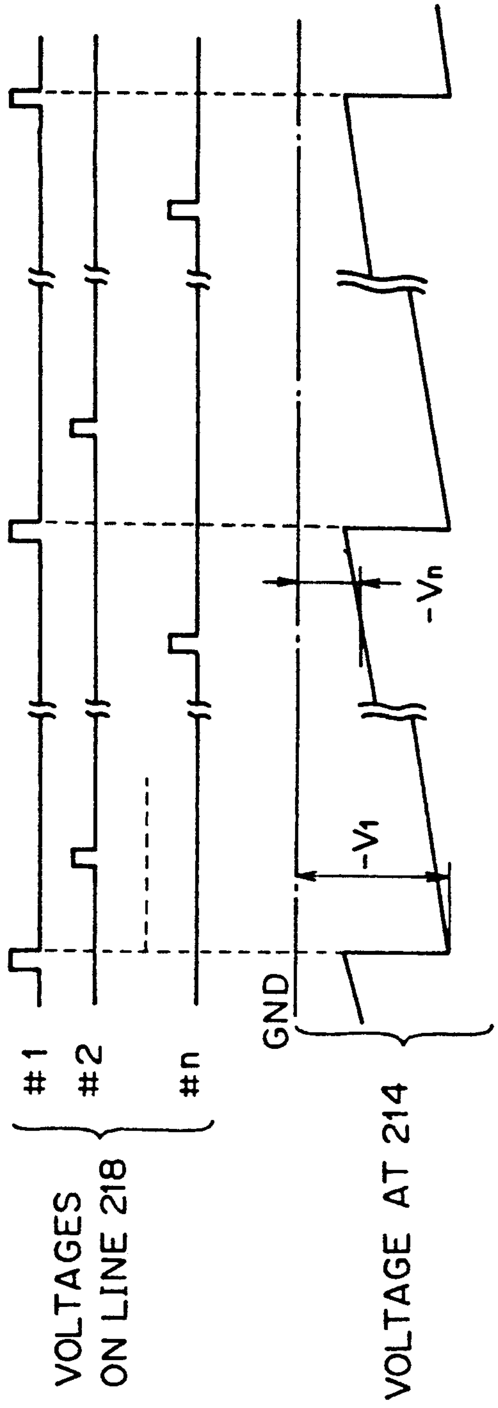

FIG. 3 shows a second embodiment. In the first embodiment, the ion current detector 120 is provided only to a cylinder fired first. Of course, this ion current detector 120 produces a sufficient negative biasing voltage for that first cylinder but the negative biasing voltage will gradually decrease for the rest of cylinders as shown in FIG. 6. Thus, the negative biasing voltage will have decreased to $-Vn$ for an Nth cylinder, not being sufficient for reliable ion current detection of Nth cylinder.

The second embodiment is to supply all the cylinders with the same biasing voltage for ion current detection.

Figures 2A, 2B, 2C:
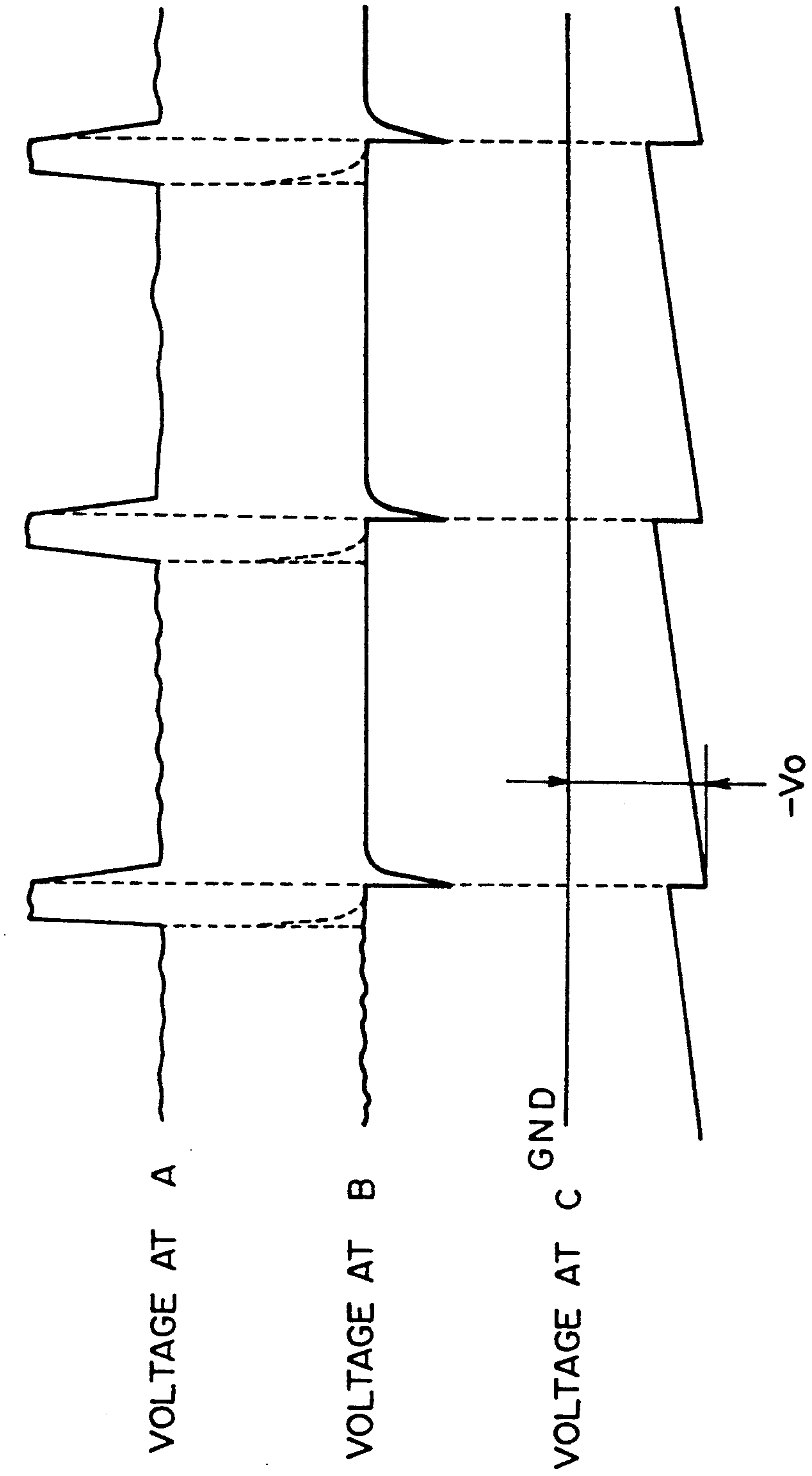
FIGS. 2A, 2B and 2C are waveform diagrams illustrating the operation of the first embodiment.

Signals from an ignition timing controller 201 drive respective power transistors 202 to turn on and off so that the respective transistors 202 cause positive voltages similar to that shown in FIG. 2A across the primary winding of an ignition coil 200. The ion current detector 220 receives these positive voltages associated with the respective cylinders from the respective transistors 202. Each of differentiation circuits is formed of a resistor $223_{1\text{-}n}$ and a capacitor $222_{1\text{-}n}$, and differentiates the positive voltage similar to that shown in FIG. 2A and sends the differentiated voltage to a rectifier formed of diodes $224_{1\text{-}n}$ and $221_{1\text{-}n}$. Then, the rectified negative voltage is held across a common capacitor 225.

The operation of the second embodiment will now be described as follows: The power transistors 202 are driven by the signals from the ignition timing controller 201 to turn on and off so as to drive the ignition coils 200. Across the secondary winding of ignition coil 200 is developed a negative high voltage 213 which is fed to an ignition plug 205 via a diode assembly 207 to ignite the air-fuel mixture. The high voltage 213 is a negative voltage and therefore does not affect the operation of a comparator 211. When ions are developed in a cylinder 212, an ion current flows through an ion current path 215 and the comparator 211 outputs an ion current signal I. A signal generator 216 detects the crank angle of the engine and sends it to the ignition controller 201. This crank angle is used to determine whether ignition is effected normally in the respective cylinders.

Figure 4:
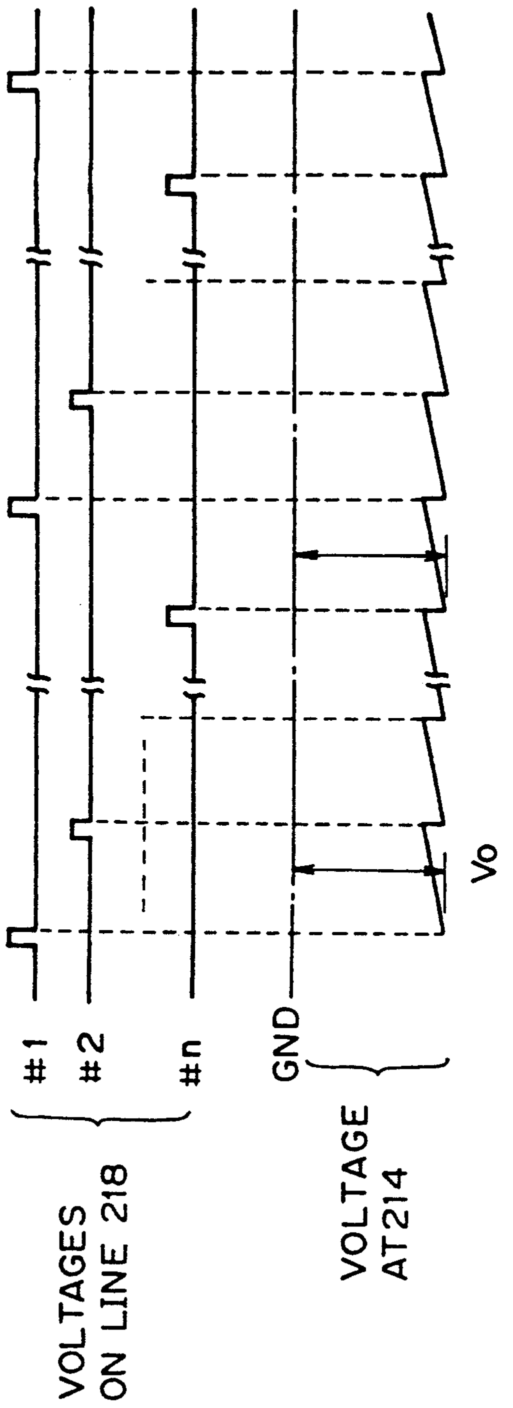
FIGS. 4-6 are waveform diagrams showing the second embodiment.
Figure 5:
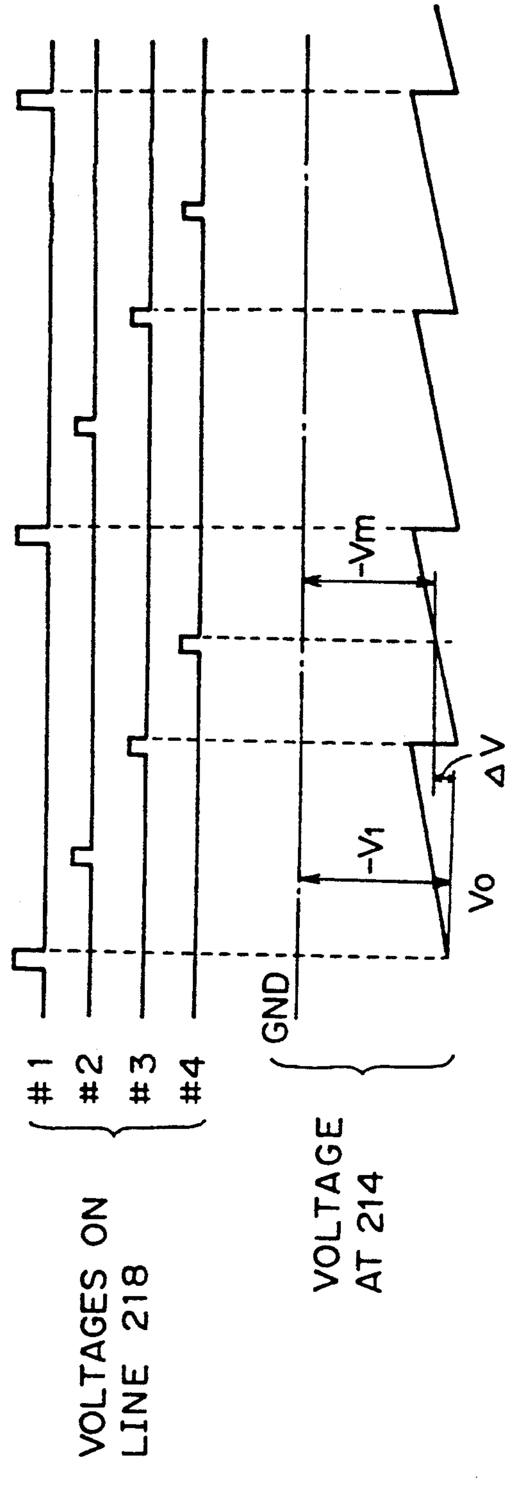

FIG. 4 shows voltages at lines 218 for the first to Nth cylinders and a negative biasing voltage produced across the capacitor 225. FIG. 5 shows the voltage at 214 when only voltages of the first and third-cylinders of a four-cylinder engine are used to produce an ion detecting biasing voltage across the capacitor 225. The biasing voltage at 214 decreases somewhat but this configuration may be useful if the ion detection characteristics are not seriously affected.

For other engines such as six-cylinder- and eight-cylinder-engines, it is preferred to produce the negative biasing voltage at 214 based on more than two lines 218.

Third embodiment

Figure 7:
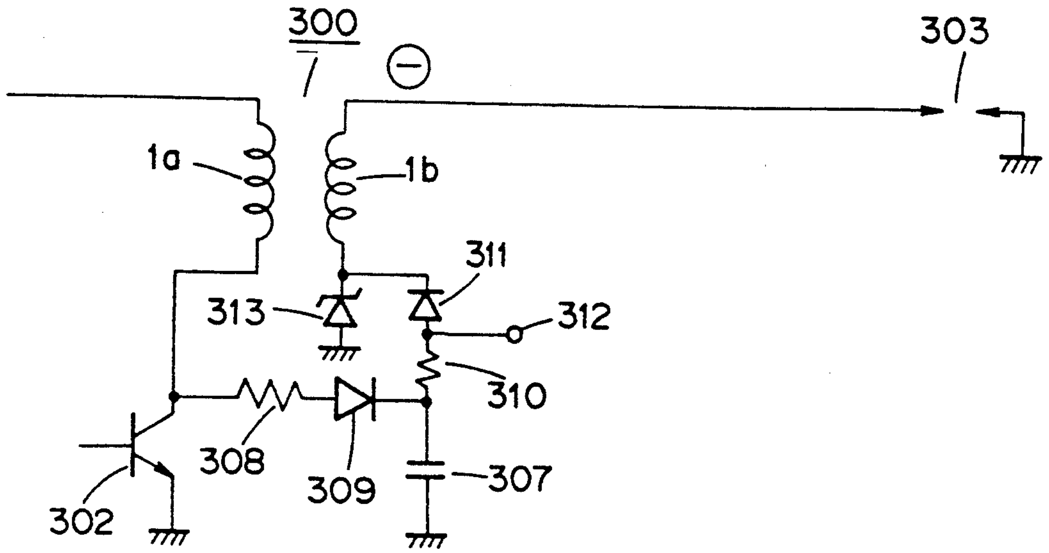
FIG. 7 shows a third embodiment where a negative high voltage is produced for ignition.

FIG. 7 shows a third embodiment where a negative high voltage is produced for ignition.

The secondary winding 1*b* of an ignition coil 300 is connected at one end thereof to an ignition plug 303 and is connected at the other end thereof to the ground via a Zener diode 313. A diode 311 is connected at its cathode to the cathode of the Zener diode 313 and is connected at its anode to an output terminal 312. Between the output terminal 312 and the ground is inserted a series connection of a resistor 310 and a capacitor 307. A resistor 308 and a diode 309 are connected in series between the junction of the resistor 310 and capacitor 307 and one end of the primary winding 1*a* of ignition coil 300. A transistor 302 is inserted between the junction point of the resistor 308 and the primary winding 1*a*.

Figure 8A:
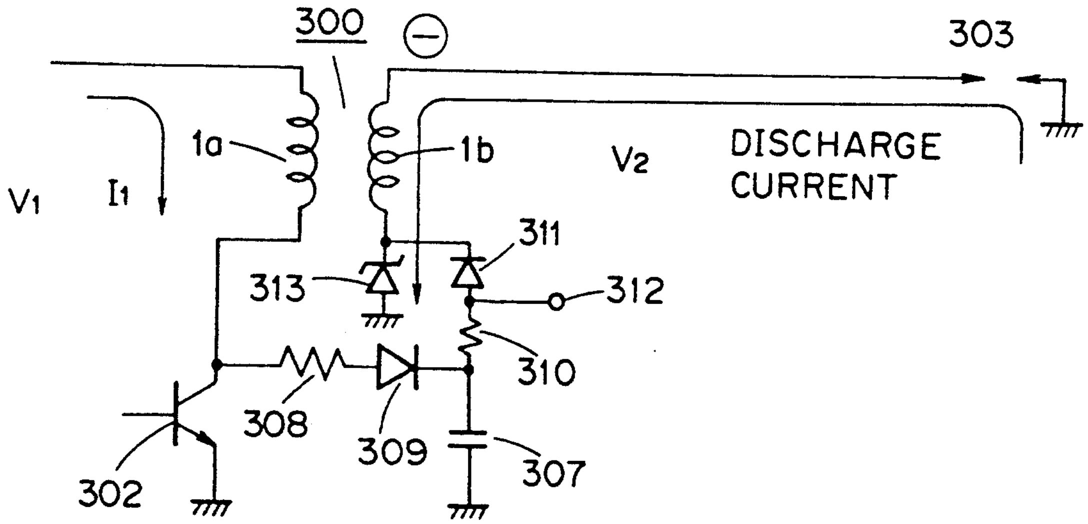
FIGS. 8A-8C show various currents in the third embodiment.
Figure 8B:
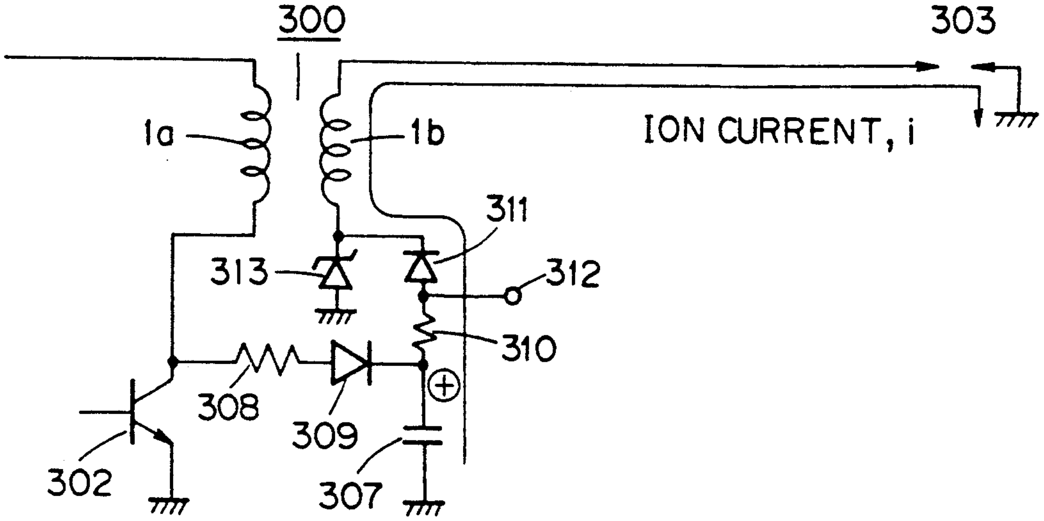
Figure 8C:
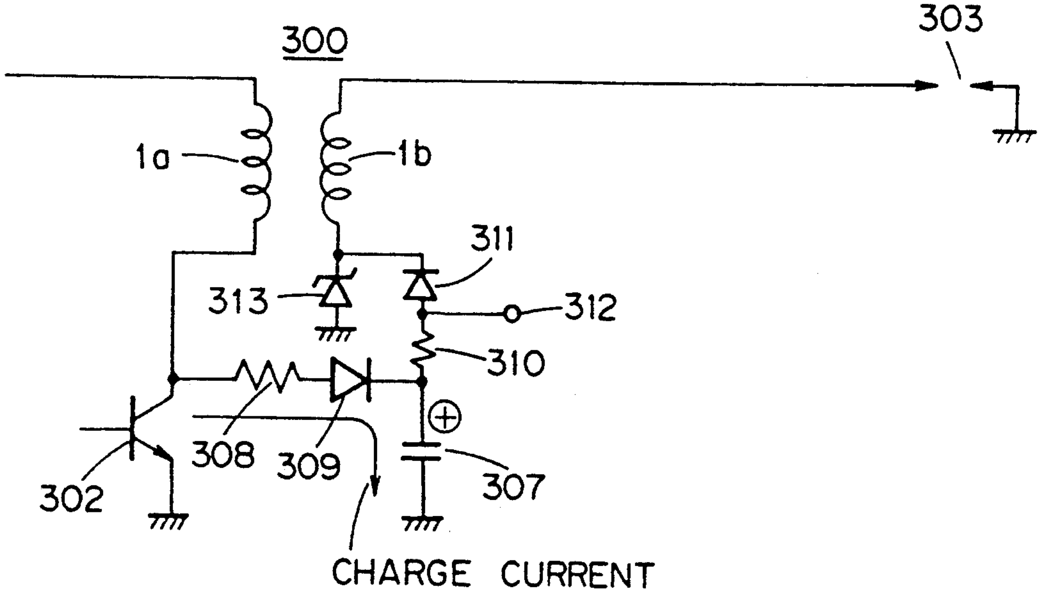
Figures 9A, 9B, 9C:
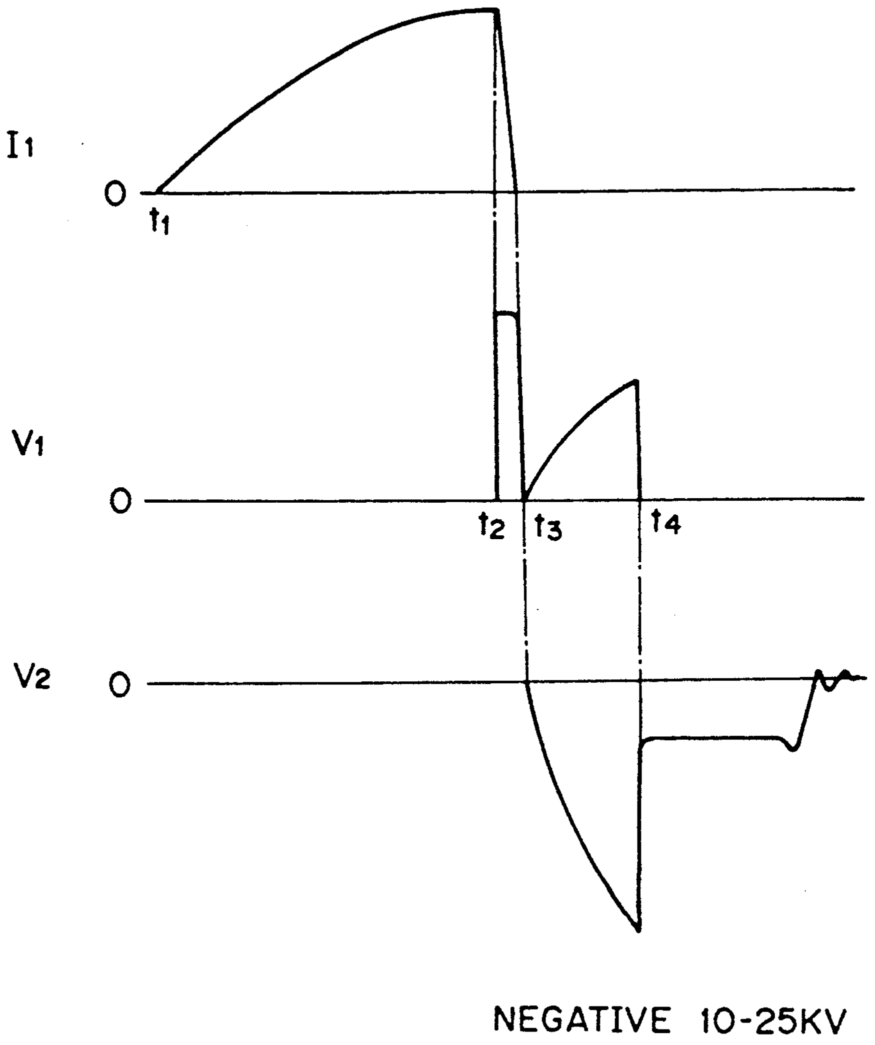
FIGS. 9A, 9B, and 9C are waveform diagrams of the respective currents and voltages in the third embodiment.

The operation of the third embodiment will now be described with reference to FIGS. 8A-8C and FIGS. 9A-9C. The power transistor 302 is turned on at time t1 in synchronism with the crank angle of an engine so as to run a primary current (FIG. 9A) through the primary winding, and is turned off at time t2. When the primary current through the primary winding 1*a* is shut off, a back voltage of about $-10$ to 25 kV is developed as shown in FIG. 9C to cause a spark between the electrodes of plug 303. Thus, a discharge current flows through a path indicated by an arrow as shown in FIG. 8A so that the air-mixture is ignited by the ignition plug 303. The Zener diode 313 serves to restrain the voltage applied to the ignition plug 303. During the combustion of air-fuel mixture, ions are developed and the positive biasing voltage of about 50 to 300 volts discharges through the electrodes of ignition plug to form a closed current path so that an ion current i flows through a path indicated by an arrow as shown in FIG. 8B. The ion current i results in a voltage (ion current signal) at an output terminal 312 from which the combustion of the cylinder is detected.

A back voltage of about 400 volts is developed across the primary winding 1*a* as shown in FIG. 9B when the primary current is shut off(times t2 to t3 in FIG. 9B), and an induced voltage appears across the primary winding when the discharge current flows(times t3 to t4 in FIG. 9B.) The induced voltage causes a charging current as depicted by an arrow in FIG. 8C to charge the capacitor 307. If the capacitor 307 is charged to a voltage higher than the zener voltage of the diode 313, then the capacitor 307 discharges through the resistor 310, diode 311, and diode 313. Thus, the zener voltage of the zener diode 313 determines a maximum voltage charged across the capacitor 307.

Fourth embodiment

Figure 10:
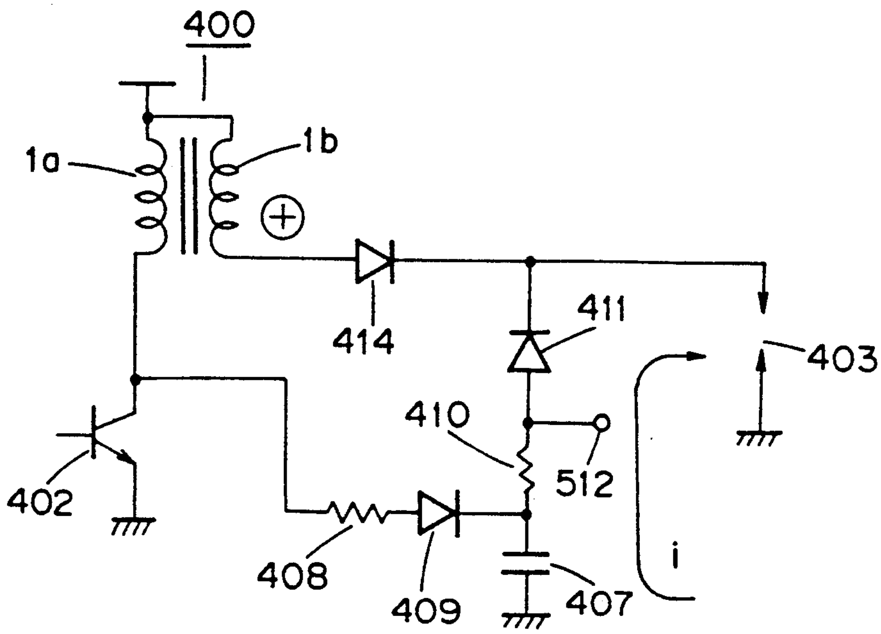
FIG. 10 shows a fourth embodiment of an ignition system where a positive high ignition voltage is generated.

FIG. 10 shows a fourth embodiment, which is a modification of the third embodiment, where a positive high ignition voltage is generated for ignition. The discharge current flows through the second winding 1*b*—diode 414—ignition plug 403—ground. The ion current i flows through a path as shown in FIG. 10. The other operation of the circuit is the same as that of the third embodiment.

Fifth embodiment

Figure 11:
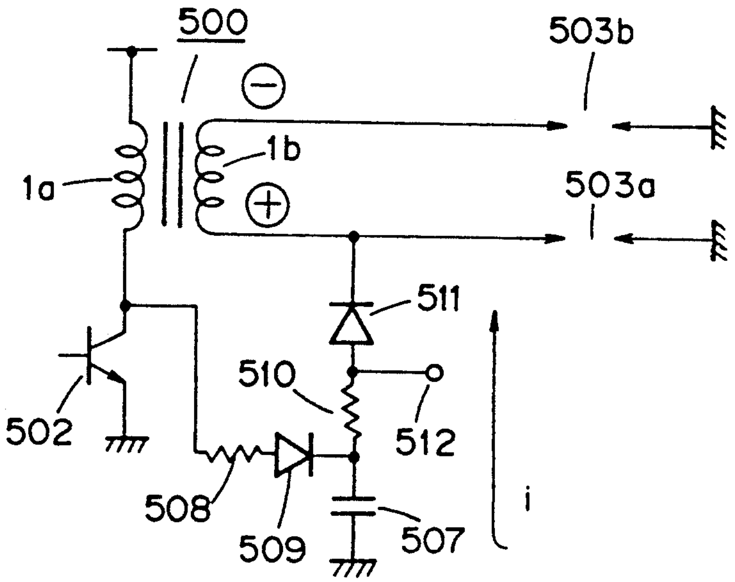
FIG. 11 shows a fifth embodiment of an ignition system where two cylinders are fired at the same time.

FIG. 11 shows a fifth embodiment, which is another modification of the third embodiment, where two plugs are fired at the same time. The discharge current flows through the second winding 1*b*—ignition plug 503*a*—ground—ignition plug 503*b*—second winding 1*b*. The ion current i flows through a path as shown in FIG. 11. The ignition timing is set such that when one cylinder is in firing stroke, the other cylinder is in discharge stroke. Thus, although the spark occurs in both the cylinders at the same time, ignition is effected only in a cylinder which is in compression stroke thereof. The other operation is the same as the third embodiment.

Sixth embodiment

Figure 12:
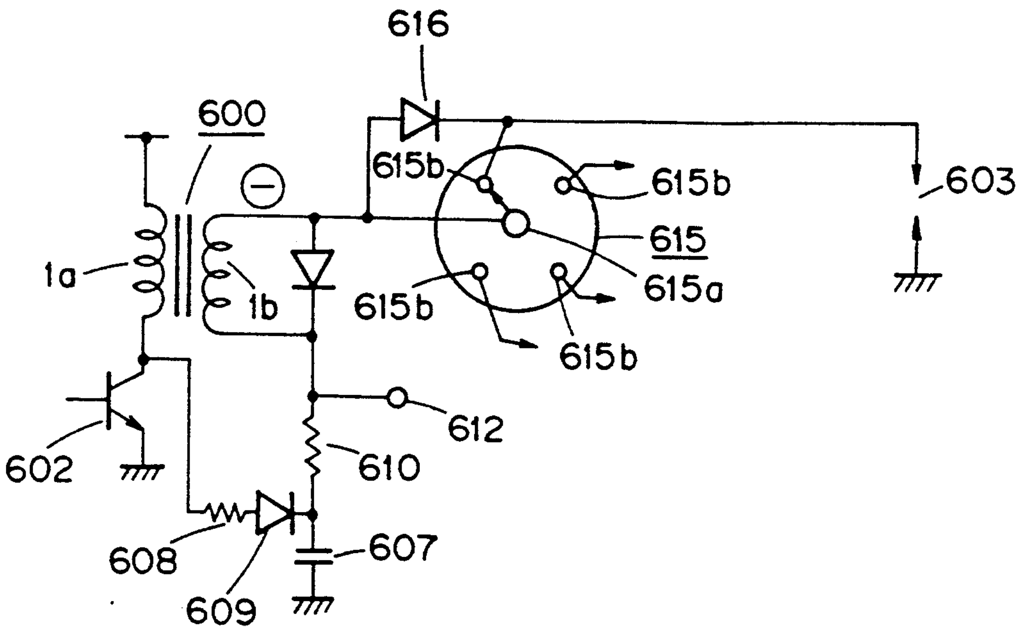
FIGS. 12-13 show a sixth embodiment of an ignition system where a distributor is used to distribute high voltages to respective cylinders, FIG. 12 showing a system for generating a negative high voltage and FIG. 13 showing a system for generating a positive high voltage.
Figure 13:
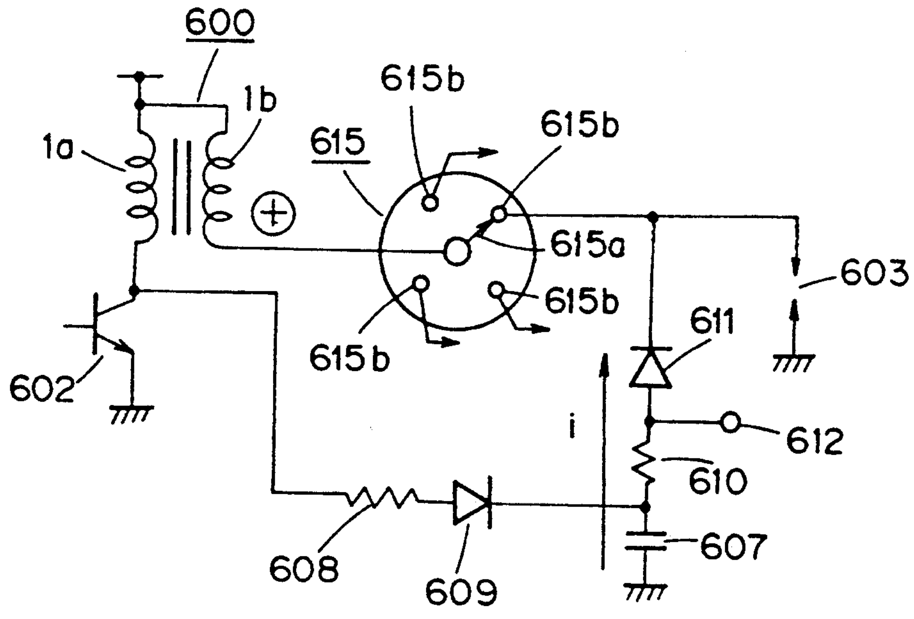
Figure 14:
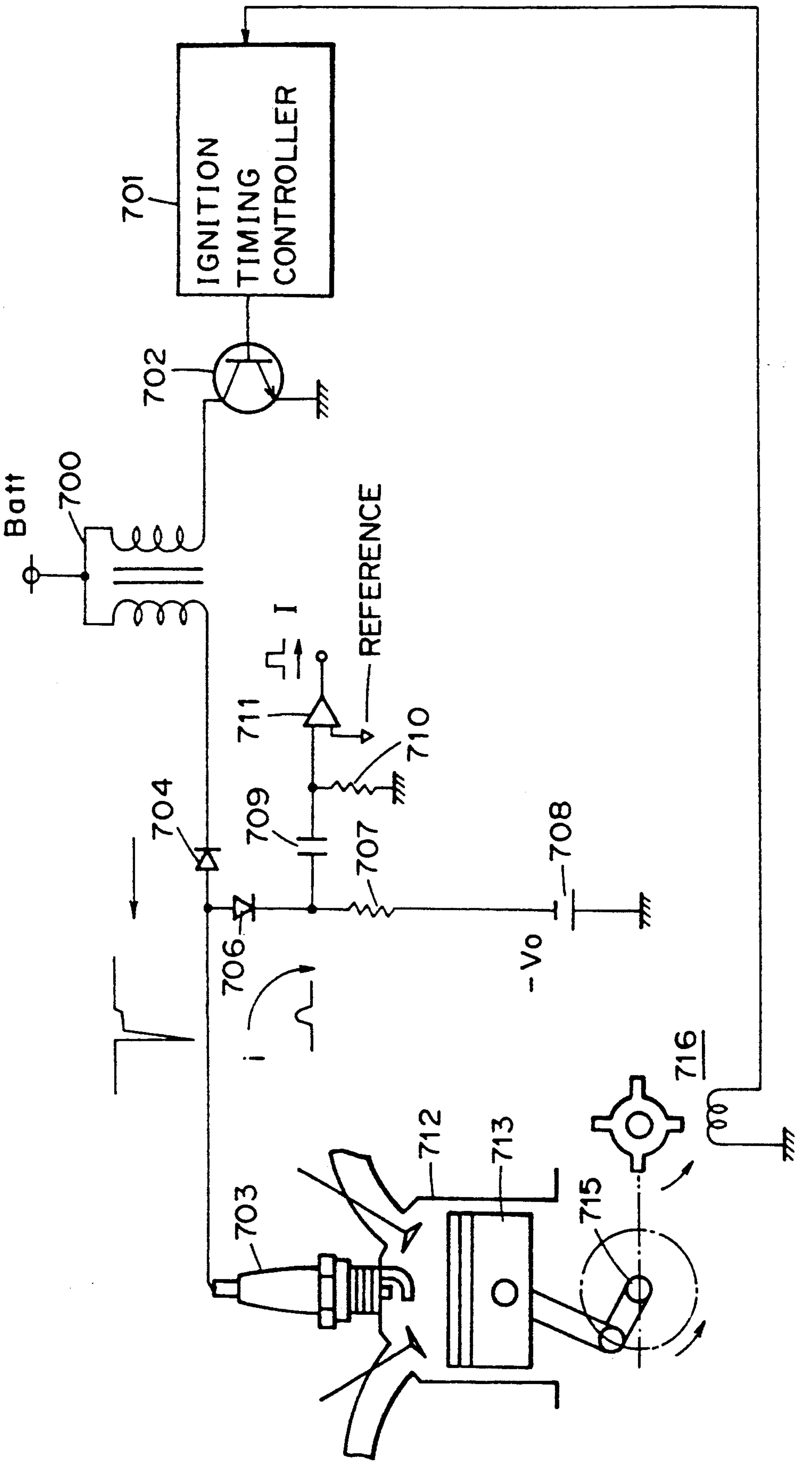
PRIOR ART FIG. 14
FIG. 14 shows a conventional ignition system for internal combustion engines.
Figure 15:
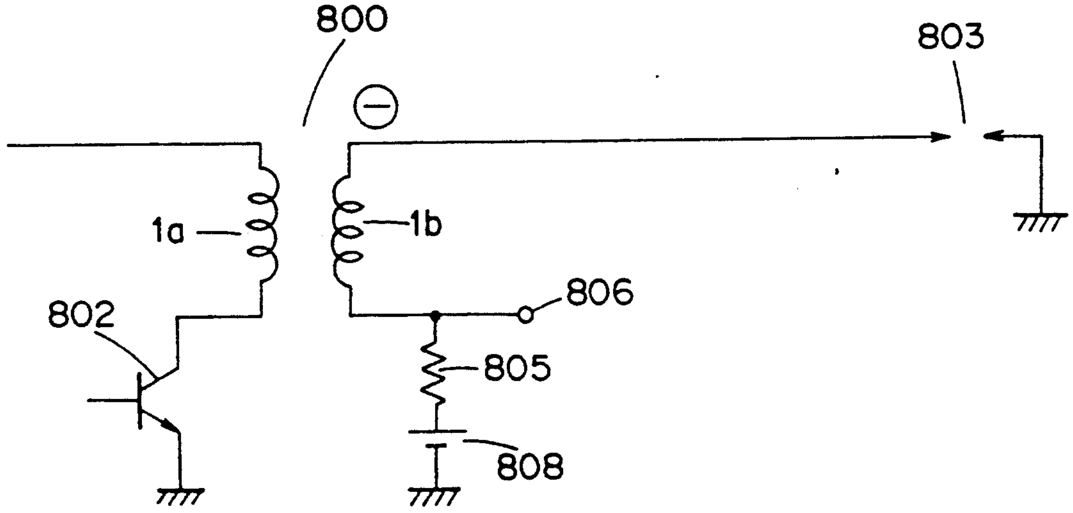
PRIOR ART FIG. 15
FIG. 15 shows another conventional ignition system.

FIGS. 12-13 show a sixth embodiment, which is still another modification of the third embodiment, where a distributor is used to distribute the high voltage to the respective cylinders. FIG. 12 shows a circuit for generating a negative high voltage for ignition. The discharge current flows through the secondary winding 1*b*—resistor 610—capacitor 607—ground—ignition plug 603—distributor 615—secondary winding 1*b*. The ion current i flows through the capacitor 607—resistor 610—secondary winding 1*b*—diode 616—ignition plug 603—ground—capacitor 607. It should be noted that the ion current flows in a direction opposite to the discharge current. Thus, the voltages appearing on the terminal 612 due to the two currents are different in polarity. Using the difference in polarity, the ion current can properly be detected by a subsequent circuit(not shown) connected to the terminal 612. The diode in parallel with the secondary winding 1*b* is inserted so as to cancel out an unwanted voltage of about 1 to 2 kV developed at a moment when the first winding is energized, whereby the ignition plug 603 is not fired by this induced voltage at a wrong timing. There is a short clearance between the center pole and the each of peripheral poles, and the insulation of the clearance is broken by the voltage across the secondary winding when the discharge current flows. However, when the ion current flows, the insulation resistance is too high for the voltage(about 200–300 V) across the capacitor 607 to break the insulation. The diode 616 is inserted in parallel with the distributor 615 to provide a path for the ion current. The other operation is the same as the third embodiment.

FIG. 13 shows a circuit for generating a positive high voltage for ignition. In FIG. 13, the discharge current flows through the secondary winding 1*b*—distributor 615—ignition plug 603—ground. The ion current i flows through the capacitor 607—resistor 610—diode 611—ignition plug 603—capacitor 607. It should be noted that the diode 616 in FIG. 12 is not required since the ion current path does not include the clearance between the center pole and peripheral poles of distributor. The other operation is the same as the third embodiment.

What is claimed is:

1. An ignition system for an internal combustion engine having at least one cylinder housing an ignition plug with electrodes, said ignition system comprising:
   - an ignition coil having a primary winding and a secondary winding, said secondary winding supplying a high voltage to the electrodes for igniting the ignition plug when said primary winding of said ignition coil is energized;
   - a voltage producing circuit comprising a capacitor having a first electrode coupled to ground and a second electrode, said capacitor being charged by voltage induced in said primary winding of said ignition coil during a discharge cycle of the ignition plug; and
   - a detector for detecting ion current flowing from said charged capacitor through said secondary winding to the ignition plug so as to determine the combustion in said cylinder, said ion current being detected at a point between said capacitor and said secondary winding.

2. An ignition system for internal combustion engines according to claim 1, wherein said voltage producing circuit includes a differentiation circuit for outputting a differentiated value of an input thereinto, a rectifier for producing a rectified negative voltage of said differentiated value, and a holding capacitor for holding said negative voltage thereacross.

3. An ignition system for internal combustion engines according to claim 1, wherein said voltage producing circuit includes a differentiation circuit for outputting a differentiated value of an input thereinto and a rectifier for producing a rectified negative voltage of said differentiated value, respectively, for at least two cylinders of a multicylinder engine, and a common capacitor connected to outputs of said rectifiers for holding said rectified negative voltages thereacross.

4. An ignition system for an internal combustion engine according to claim 1, further comprising a zener diode inserted between said secondary winding and ground, and wherein
   - said voltage producing circuit further comprises a first series circuit including a first resistor and a first diode connected between said second electrode of said capacitor and said primary winding for supplying a charging current to said capacitor when said primary winding is energized; and
   - wherein said detector comprises a second series circuit including a second resistor and a second diode inserted between said second electrode of said capacitor and said secondary winding, said second series circuit allowing an ion current to flow through said capacitor to said secondary winding,
   - wherein during said discharge cycle a discharge current of the ignition plug flows through said secondary winding and said zener diode when said primary winding is deenergized.

5. An ignition system for internal combustion engines according to claim 1, wherein
   - said voltage producing circuit includes a holding capacitor having a first electrode grounded and a second electrode, a first series circuit of a first resistor and a first diode connected between said second electrode and said secondary winding to supply a charging current to said holding capacitor when said primary winding is energized; and
   - said detector includes a second series circuit of a second resistor and a second diode inserted between said second electrode and said ignition plug, said second series circuit and said holding capacitor forming a path for an ion current such that the ion current is detected at an junction point of said second resistor and second diode of said second series circuit.

6. An ignition system for internal combustion engines according to claim 5, wherein said high voltage is a positive voltage and is supplied to said ignition plug via a diode.

7. An ignition system for internal combustion engines according to claim 5, wherein said high voltage is a positive voltage and is supplied to said ignition plug via a distributor.

8. An ignition system for internal combustion engines according to claim 5, wherein said secondary winding has a first end connected to a first ignition plug of a first cylinder and a second end connected to a second ignition plug of a second cylinder, said first cylinder and said second cylinder are alternately in a combustion cycle and in a discharge cycle.

9. An ignition system for internal combustion engines according to claim 1, wherein
   - said high voltage is a negative voltage;
   - said secondary winding has a first end and second end, said second end supplying said negative high voltage to an ignition plug via a distributor;
   - said voltage producing circuit includes a holding capacitor having a first electrode grounded and a second electrode, a first series circuit of a first resistor and a first diode connected between said second electrode and said primary winding to supply a charging current to said holding capacitor when said primary winding is energized; and said detector includes a second resistor inserted between a second electrode of said holding capacitor and said first end, and a second diode connected in parallel with the distributor; whereby said holding capacitor, said second resistor, said secondary winding, and said second diode forming a path for an ion current such that the ion current is detected at an junction point of said second resistor and said first end.

* * * * *